(12) United States Patent
Prakah-Asante et al.

(10) Patent No.: US 7,138,938 B1
(45) Date of Patent: Nov. 21, 2006

(54) SYSTEM AND METHOD FOR PREEMPTIVELY SENSING AN OBJECT AND SELECTIVELY OPERATING BOTH A COLLISION COUNTERMEASURE SYSTEM AND A PARKING ASSISTANCE SYSTEM ABOARD AN AUTOMOTIVE VEHICLE

(75) Inventors: Kwaku O. Prakah-Asante, Commerce Township, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/908,315

(22) Filed: May 6, 2005

(51) Int. Cl.
- G01S 13/93 (2006.01)
- G01S 15/93 (2006.01)
- G01S 13/86 (2006.01)
- G08G 1/16 (2006.01)
- B60W 30/08 (2006.01)
- B60W 30/06 (2006.01)
- G01S 13/00 (2006.01)

(52) U.S. Cl. ............... 342/70; 342/52; 342/175; 342/195; 342/27; 342/28; 701/300; 701/301; 367/87; 367/93; 367/94; 367/99

(58) Field of Classification Search ........ 180/167–169; 701/300, 301; 342/27, 28, 52–54, 70–72, 342/175, 195; 367/87, 93, 94, 99–116
See application file for complete search history.

(56) References Cited

U.S. PATENT DOCUMENTS

| | | | | |
|---|---|---|---|---|
| 3,493,920 A | * | 2/1970 | MacMunn | 367/112 |
| 3,749,197 A | * | 7/1973 | Deutsch | 180/169 |
| 5,594,413 A | * | 1/1997 | Cho et al. | 180/169 |
| 5,767,793 A | | 6/1998 | Agravante et al. | |
| 5,995,037 A | | 11/1999 | Matsuda et al. | |
| 6,026,340 A | | 2/2000 | Corrado et al. | |
| 6,055,042 A | * | 4/2000 | Sarangapani | 180/167 |
| 6,268,804 B1 | * | 7/2001 | Janky et al. | 180/169 |
| 6,295,495 B1 | | 9/2001 | Morman et al. | |
| 6,452,535 B1 | | 9/2002 | Rao et al. | |
| 6,480,144 B1 | | 11/2002 | Miller et al. | |
| 6,498,972 B1 | | 12/2002 | Rao et al. | |
| 6,568,754 B1 | | 5/2003 | Norton et al. | |
| 6,628,227 B1 | | 9/2003 | Rao et al. | |
| 6,650,983 B1 | | 11/2003 | Rao et al. | |
| 6,650,984 B1 | | 11/2003 | Rao et al. | |
| 6,680,688 B1 | * | 1/2004 | Jiang et al. | 342/52 |
| 6,708,095 B1 | | 3/2004 | Prakah-Asante et al. | |
| 6,728,617 B1 | | 4/2004 | Rao et al. | |
| 6,757,611 B1 | | 6/2004 | Rao et al. | |

(Continued)

Primary Examiner—Bernarr E. Gregory
(74) Attorney, Agent, or Firm—Frank A. MacKenzie

(57) ABSTRACT

A system and method for preemptively sensing an object in the potential drive path of an automotive vehicle and selectively operating both a collision countermeasure system and a parking assistance system aboard the automotive vehicle are disclosed herein. The system includes a radar sensor, ultrasonic sensors, and a data processing system mounted aboard the automotive vehicle. The data processing system is electrically connected to the radar sensor, the ultrasonic sensors, the collision countermeasure system, and the parking assistance system. The sensors are operable to cooperatively sense the position of the object in the potential drive path of the automotive vehicle and accordingly transmit sensor data to the data processing system. The data processing system is operable to receive the sensor data, selectively process the sensor data, and accordingly transmit operating instructions to the collision countermeasure system and the parking assistance system so as to selectively operate both systems.

20 Claims, 8 Drawing Sheets

U.S. PATENT DOCUMENTS

| | | |
|---|---|---|
| 6,775,605 B1 | 8/2004 | Rao et al. |
| 6,784,791 B1 | 8/2004 | Rao et al. |
| 6,801,843 B1 | 10/2004 | Rao et al. |
| 6,819,991 B1 | 11/2004 | Rao et al. |
| 6,897,768 B1 * | 5/2005 | Sato et al. .................. 180/167 |
| 2003/0060956 A1 | 3/2003 | Rao et al. |
| 2003/0060980 A1 | 3/2003 | Prakah-Asante et al. |
| 2004/0051659 A1 * | 3/2004 | Garrison ...................... 342/70 |
| 2004/0117091 A1 | 6/2004 | Prakah-Asante et al. |

* cited by examiner

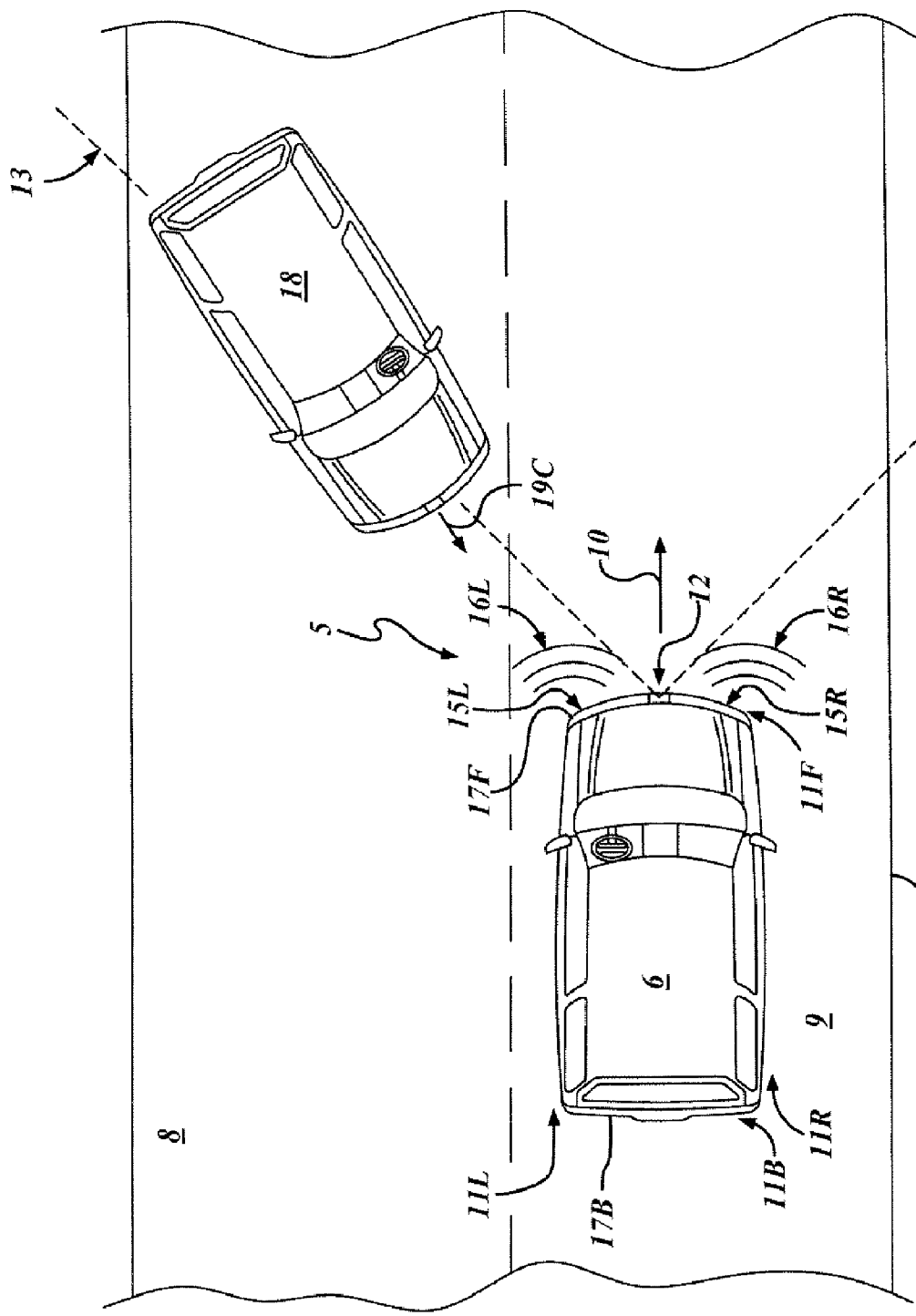

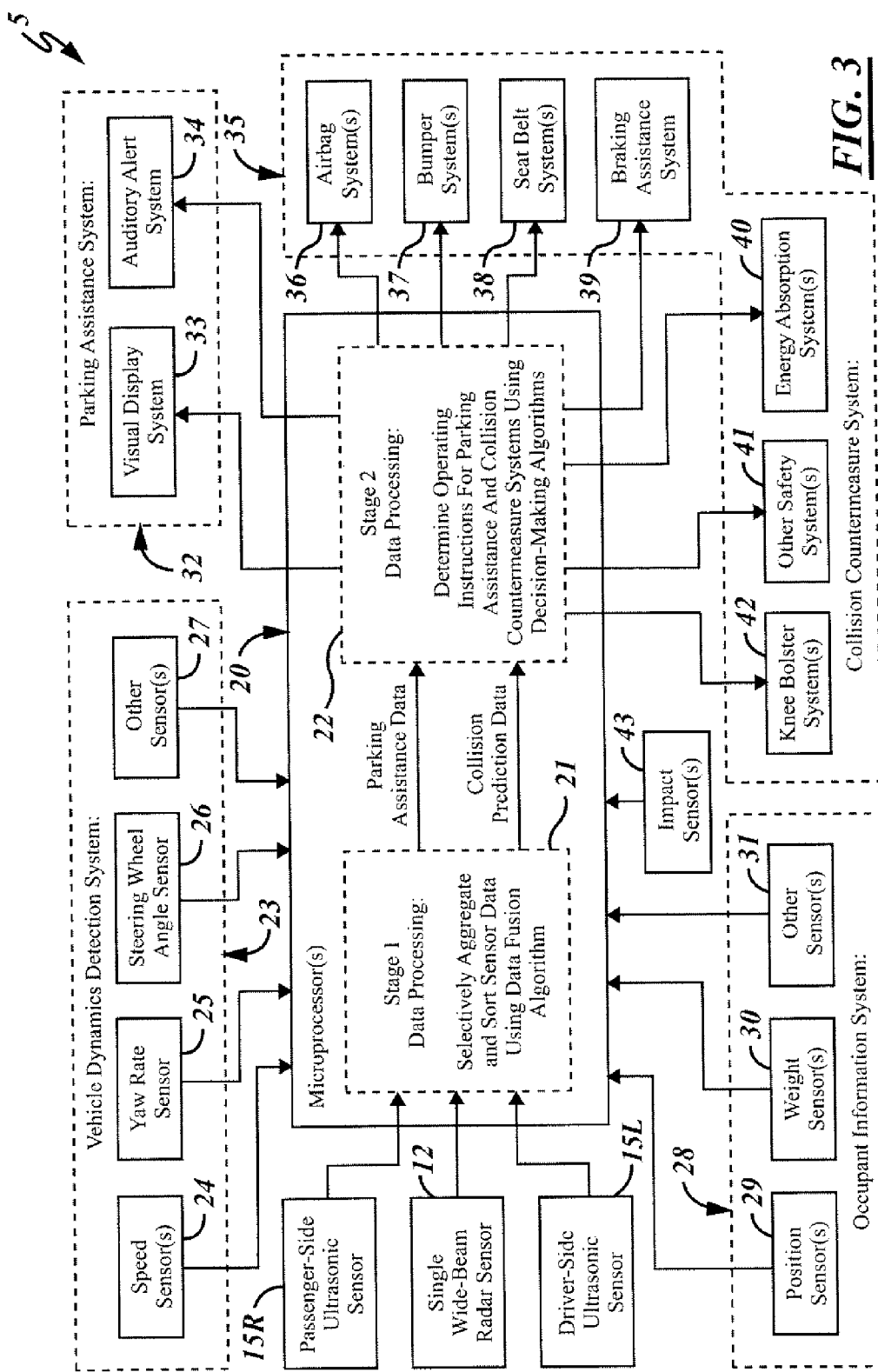

SYSTEM AND METHOD FOR PREEMPTIVELY SENSING AN OBJECT AND SELECTIVELY OPERATING BOTH A COLLISION COUNTERMEASURE SYSTEM AND A PARKING ASSISTANCE SYSTEM ABOARD AN AUTOMOTIVE VEHICLE

FIELD OF THE INVENTION

The present invention generally relates to automotive vehicles and on-board vehicular systems. The present invention more particularly relates to automotive vehicles having collision prediction sensing systems, collision countermeasure systems, or parking assistance systems on board.

BACKGROUND OF THE INVENTION

Due to large volumes of motor vehicle traffic, high rates of vehicle travel speed, complex multi-lane intersections, winding road systems, and crowded vehicle parking lots, drivers today are frequently overwhelmed as they attempt to safely navigate their automotive vehicles to and from intended destinations. To assist vehicle drivers in their daily commutes, modern automobile manufacturers are increasingly producing and selling automotive vehicles that include various collision prediction sensing systems, collision countermeasure systems, and/or parking assistance systems on board.

Collision countermeasure systems included in modern automotive vehicles are each typically equipped with an operatively cooperating collision prediction sensing system. The collision prediction sensing system, in turn, is typically equipped with radar and/or vision sensors that are mounted on the front of the automotive vehicle. Such radar and/or vision sensors characteristically have extensive fields of view (FOV) that are sufficient to sense or detect a remote object or vehicle at a distance of up to about 40 meters away from the front of the automotive vehicle. Equipped with such sensors and based on the sensor data that is collected therefrom, the collision prediction sensing system on board an automotive vehicle is thus able to determine both the relative position and the relative velocity of another object or vehicle detected within its overall field of view. In making such determinations, the collision prediction sensing system is thereby ultimately able to predict both the type and the severity of an anticipated collision with a detected remote object or vehicle. In cooperation with the collision prediction sensing system, the collision countermeasure system operates in turn to selectively arm, deploy, and/or activate various safety systems on board the automotive vehicle according to the type and severity of an anticipated collision predicted by the collision prediction sensing system. Such various safety systems or countermeasures may include, for example, various types of airbag systems, seat belt systems, bumper systems, braking assistance systems, knee bolster systems, et cetera.

Parking assistance systems included in modern automotive vehicles too are each typically equipped with an operatively cooperating collision prediction sensing system. The collision prediction sensing system, in turn, is typically equipped with ultrasonic sensors that are most commonly mounted on the front and/or back of the automotive vehicle. A parking assistance system on board an automotive vehicle is typically designed to operate only when the vehicle is moving at a reduced level of speed such as, for example, at or below about 10 miles per hour (mph) or 16 kilometers per hour (kph). When the parking assistance system is operating, any ultrasonic sensors mounted on the front of the automotive vehicle typically work to sense or detect remote structures, objects, or vehicles at distances of up to about 60 centimeters (cm) or 0.6 meter (m) away from the front of the vehicle. In contrast thereto, any ultrasonic sensors mounted on the back of the automotive vehicle typically work to detect remote structures, objects, or vehicles at distances of up to about 180 cm (1.8 m) away from the back of the vehicle. If or when the collision prediction sensing system actually senses a remote structure, object, or vehicle within its overall sensing range, the parking assistance system then alerts the driver within the automotive vehicle's cabin via visual and/or audible indicators or alerting devices.

To best prevent injury to a driver or occupant in an automotive vehicle and also help prevent damage to the vehicle itself, a few automobile manufacturers are now incorporating both a collision countermeasure system and a parking assistance system in some of their vehicles. Incorporating both such systems in a single automotive vehicle, however, has some consequential drawbacks. In particular, incorporating both systems generally necessitates additional vehicle components, consumes and requires more on-board space, adds more weight to the vehicle, and results in higher manufacturing costs.

To help minimize such drawbacks, automobile manufacturers have heretofore proposed various schemes to integrate both systems aboard an automotive vehicle in an attempt to reduce the cumulative amount of hardware thereon. In an integration scheme proposed by one manufacturer, for example, the requisite number of sensors aboard the automotive vehicle was effectively reduced by having both systems share use of one or more of the sensors. That is, instead of having each on-board sensor be operationally dedicated to only one of the two systems, the manufacturer had both systems share use of one or more of the sensors so as to minimize sensor redundancy. See U.S. Pat. No. 6,784,791 issued to Rao et al. on Aug. 31, 2004.

Although some of such integration schemes have been reasonably successful in minimizing the above-described drawbacks, further integration is yet desirable. In particular, in many of the integrated systems included in automotive vehicles to date, the various types of sensor data collected from the various different types of on-board sensors are, at least initially, typically processed separately according to sensor type. For example, sensor data initially collected from one or more on-board radar sensors is typically processed separate from sensor data initially collected from one or more on-board ultrasonic sensors. As a consequence, the cumulative time required to process all types of sensor data is typically somewhat lengthy. Hence, the span of time extending from when an object is initially sensed to when impact therewith is accurately anticipated is also somewhat lengthy, thereby undesirably limiting the amount of time for the collision countermeasure system and/or the parking assistance system to formulate and tailor an appropriate counteracting response. Furthermore, as an added consequence, depending on the various types of sensors on board, dual or even multiple sensor-specific data processing systems are often required for initial sensor data processing in a given vehicular system. Hence, the requisite amount of data processing system hardware is often undesirably excessive and correspondingly both space-consuming and costly as well.

In light of the above, there is a present need in the art for an on-board vehicular system that (1) preemptively senses an object in the potential drive path of an automotive vehicle, (2) selectively operates both a collision countermeasure system and a parking assistance system aboard the automotive vehicle, and (3) accomplishes such through the shared use of one or more sensors among on-board systems (i.e., sensor hardware integration) and also through the aggregated processing of various types of sensor data (i.e., sensor data fusion).

SUMMARY OF THE INVENTION

The present invention provides an on-board vehicular system for preemptively sensing an object in the potential drive path of an automotive vehicle and selectively operating both a collision countermeasure system and a parking assistance system aboard the automotive vehicle. In one practicable embodiment, the on-board vehicular system includes a radar sensor, at least two ultrasonic sensors, and a data processing system, which are all mounted aboard the automotive vehicle. The data processing system is electrically connected to the radar sensor, the ultrasonic sensors, the collision countermeasure system, and the parking assistance system. In such a configuration, the radar sensor and the ultrasonic sensors are operable to cooperatively sense the position of the object in the potential drive path of the automotive vehicle and accordingly transmit radar sensor data and ultrasonic sensor data to the data processing system. The data processing system, in turn, is operable to receive the radar sensor data and the ultrasonic sensor data, selectively process the radar sensor data and the ultrasonic sensor data, and accordingly transmit operating instructions to the collision countermeasure system and the parking assistance system so as to operate the collision countermeasure system and the parking assistance system in a selective manner.

In a preferred embodiment, the radar sensor and two ultrasonic sensors are mounted at the frontal periphery of the automotive vehicle. In one embodiment, for example, the radar sensor is mounted at the center of the frontal periphery of the automotive vehicle, and the radar sensor is operable to produce a beam having an angular field of view (FOV) of at least 60 degrees. In the same embodiment, the two ultrasonic sensors are spaced apart and mounted at opposite sides of the frontal periphery of the automotive vehicle, one on each side of the centrally mounted radar sensor.

Also in a preferred embodiment, the data processing system comprises one or more microprocessors and has both means for executing a data fusion algorithm and means for executing decision-making algorithms. During operation, the data processing system frequently executes the data fusion algorithm to selectively aggregate and sort the radar sensor data and the ultrasonic sensor data. In addition, the data processing system also frequently executes the decision-making algorithms to determine the operating instructions for the collision countermeasure system and the parking assistance system in accordance with the radar sensor data and the ultrasonic sensor data.

In addition to the above, the present invention also provides a method for preemptively sensing an object in the potential drive path of an automotive vehicle and selectively operating both a collision countermeasure system and a parking assistance system aboard the automotive vehicle. In one practicable methodology, the method includes the step of operating a radar sensor aboard the automotive vehicle to sense the position of the object in the potential drive path of the automotive vehicle and accordingly transmit radar sensor data to a data processing system aboard the automotive vehicle. In the same methodology, the method also includes the step of operating at least two ultrasonic sensors aboard the automotive vehicle to sense the position of the object in the potential drive path of the automotive vehicle and accordingly transmit ultrasonic sensor data to the data processing system aboard the automotive vehicle. Furthermore, in the same methodology, the method also includes the step of operating the data processing system to receive the radar sensor data and the ultrasonic sensor data, selectively process the radar sensor data and the ultrasonic sensor data, and accordingly transmit operating instructions to the collision countermeasure system and the parking assistance system so as to operate the collision countermeasure system and the parking assistance system in a selective manner.

In a preferred methodology, the method includes the frequently performed sub-step of operating the data processing system to execute a data fusion algorithm so as to selectively aggregate and sort the radar sensor data and the ultrasonic sensor data. In one methodology, for example, the radar sensor data and the ultrasonic sensor data are selectively aggregated and sorted into at least one of two data categories that are predefined as data utile for collision prediction and data utile for parking assistance.

Also in a preferred methodology, the method includes the sub-step of operating the data processing system to receive dynamics data of the automotive vehicle and therefrom determine the average speed of the automotive vehicle. In the same methodology, the method also includes the sub-step of operating the data processing system to determine whether the average speed of the automotive vehicle is greater than a predetermined parking assistance speed limit. When the average speed of the automotive vehicle is determined to be greater than the predetermined parking assistance speed limit, the method includes the sub-step of operating the data processing system to selectively process the radar sensor data and accordingly transmit operating instructions to the collision countermeasure system so as to operate the collision countermeasure system in a selective manner. When, on the other hand, the average speed of the automotive vehicle is determined to be less than the predetermined parking assistance speed limit, the method includes the sub-step of operating the data processing system to selectively process the radar sensor data and the ultrasonic sensor data and accordingly transmit operating instructions to the parking assistance system so as to operate the parking assistance system in a selective manner.

Furthermore, it is believed that various other embodiments, design considerations, methodologies, applications, and advantages of the present invention will become apparent to those skilled in the art when the detailed description of the best mode contemplated for practicing the invention, as set forth hereinbelow, is reviewed in conjunction with the appended claims and the accompanying drawing figures.

BRIEF DESCRIPTION OF THE DRAWINGS

The present invention is described hereinbelow, by way of example, with reference to the following drawing figures.

In FIG. 1, the automotive vehicle includes a system for preemptively sensing an object in its potential drive path and selectively operating both a collision countermeasure system and a parking assistance system on board.

FIG. 2C is an aerial view wherein the automotive vehicle of FIG. 1 is facing a potential collision with the front end of a vehicle that is out of control and oncoming from an oblique direction.

FIG. 3 is a block diagram of the system on board the automotive vehicle of FIG. 1. In FIG. 3, the on-board vehicular system is shown to include a data processing system comprising one or more microprocessors.

FIG. 4A highlights method steps executed by the data processing system when the automotive vehicle of FIG. 1 is operating in a "traveling mode."

FIG. 4B highlights method steps executed by the data processing system of FIG. 3 when the automotive vehicle of FIG. 1 is operating in a "parking assistance mode."

FIG. 4C highlights method steps executed by the data processing system of FIG. 3 when the automotive vehicle of FIG. 1 is operating in a "collision countermeasure activation mode."

DETAILED DESCRIPTION OF THE INVENTION

Figure 1:
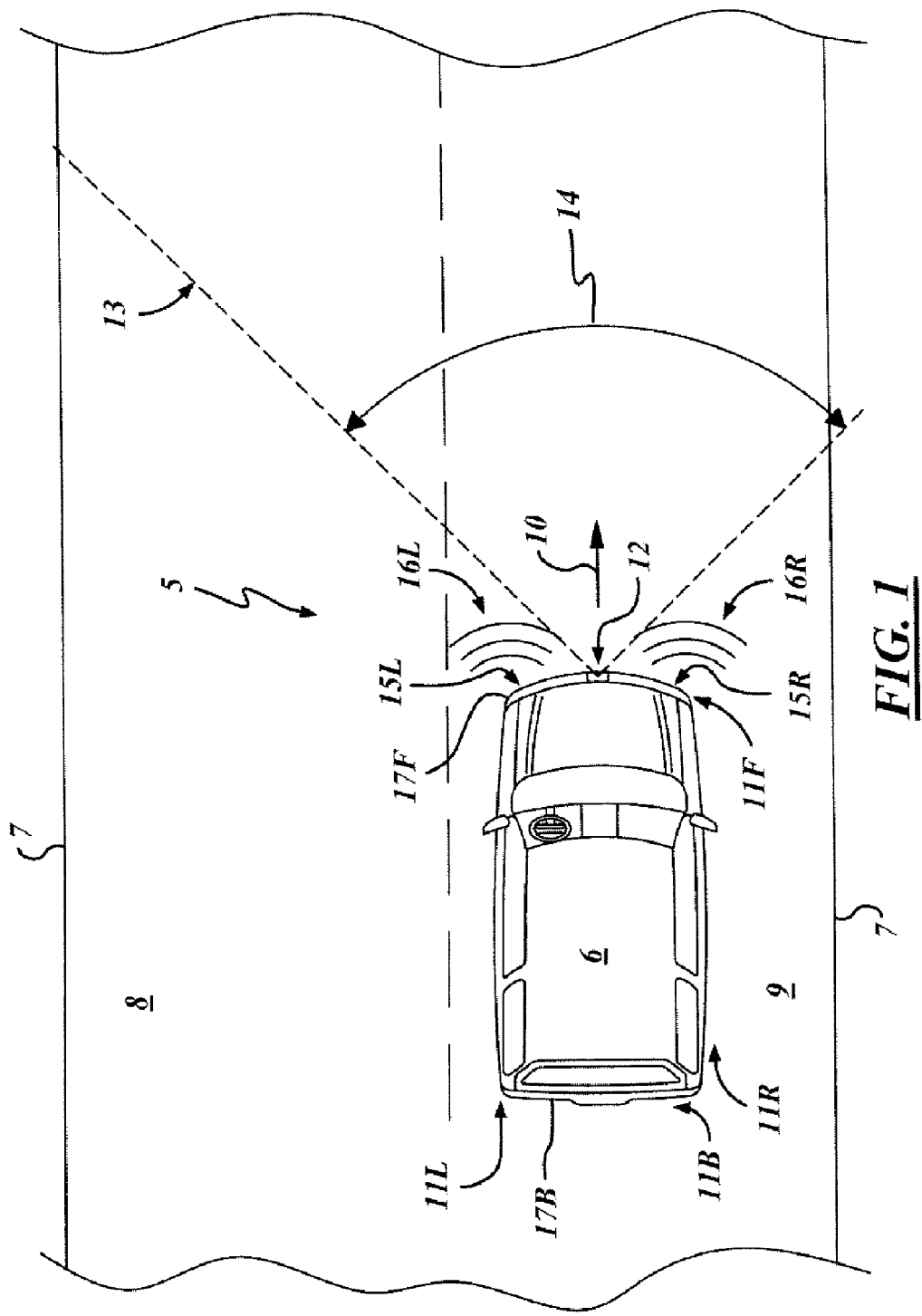
FIG. 1 is an aerial view of an automotive vehicle that is traveling on a road.

FIG. 1 is an aerial view of an automotive vehicle 6 that is traveling on a road 7. In this view, the automotive vehicle 6 is traveling in a direction 10 and within the right-hand lane 9 of the road 7. Pursuant to the present invention, the automotive vehicle 6 includes a system 5 for preemptively sensing an object in its potential drive path and selectively operating both a collision countermeasure system 35 and a parking assistance system 32 on board.

As co-illustrated in FIGS. 1 and 3, the on-board vehicular system 5 includes a radar sensor 12, two ultrasonic sensors 15L and 15R, and a data processing system 20 mounted aboard the automotive vehicle 6. The data processing system 20 is electrically connected to the radar sensor 12, the two ultrasonic sensors 15L and 15R, the collision countermeasure system 35, and the parking assistance system 32. In such a configuration, the radar sensor 12 and the two ultrasonic sensors 15L and 15R are operable to cooperatively sense the position of an object in the potential drive path of the automotive vehicle 6 and accordingly transmit radar sensor data and ultrasonic sensor data to the data processing system 20. The data processing system 20, in turn, is operable to receive the radar sensor data and the ultrasonic sensor data, selectively process the radar sensor data and the ultrasonic sensor data, and accordingly transmit operating instructions to the collision countermeasure system 35 and the parking assistance system 32 so as to operate the collision countermeasure system 35 and the parking assistance system 32 in a selective manner.

As illustrated in FIG. 1, the radar sensor 12 is preferably mounted at the center of the frontal periphery 11F of the automotive vehicle 6. To mount the radar sensor 12 in this fashion, the radar sensor 12 may, for example, be nested within and/or behind either the fascia of the front bumper 17F or the front grill of the vehicle 6. The radar sensor 12 itself is preferably a single wide-beam type radar sensor that is operable to produce a beam 13 having an angular field of view (FOV) 14 of at least 60 degrees. The radar sensor 12 can generally sense or detect a remote object or vehicle at a distance of up to about 40 meters away from the front of the automotive vehicle 6. During operation, radar sensor data produced by the radar sensor 12 is generally shared and utilized to selectively operate both the collision countermeasure system 35 and the parking assistance system 32.

Although it is certainly within the purview of the present invention to situate or mount the radar sensor 12 in other positions on the automotive vehicle 6, experience has heretofore demonstrated that the radar sensor 12 be preferably situated at the periphery 11 of the vehicle 6. In this way, the radar sensor's field of view (FOV) is neither unduly limited nor interfered with by other structures on the automotive vehicle 6. In addition, experience has also demonstrated that the radar sensor 12 be preferably situated at or near the center of the frontal periphery 11F of the automotive vehicle 6. In this way, other objects, either stationary or moving, in the vehicle's potential forward drive path are preemptively sensed and proactively addressed by the system 5 on board the automotive vehicle 6.

As also illustrated in FIG. 1, the two ultrasonic sensors 15L and 15R are preferably spaced apart and mounted at opposite sides of the frontal periphery 11F of the automotive vehicle 6. To mount the two ultrasonic sensors 15L and 15R in this fashion, the two ultrasonic sensors 15L and 15R may, for example, be fixed onto the cover of the front bumper 17F, one on each side of the centrally mounted radar sensor 12. During operation, the two ultrasonic sensors 15L and 15R respectively emit patterns of ultrasonic (sound) waves 16L and 16R to sense an object. The two ultrasonic sensors 15L and 15R can each generally sense or detect a remote object or vehicle at a distance of up to about 2.0 meters away from the front of the automotive vehicle 6. Given the ultrasonic sensors' characteristic short sensing ranges, ultrasonic sensor data respectively produced by the two ultrasonic sensors 15L and 15R is generally utilized to selectively operate only the parking assistance system 32.

Although it is certainly within the purview of the present invention to situate or mount the two ultrasonic sensors 15L and 15R in other positions on the automotive vehicle 6, experience has heretofore demonstrated that the two ultrasonic sensors 15L and 15R be preferably situated at the periphery 11 of the vehicle 6. In this way, the ultrasonic sensors' respective patterns of ultrasonic waves 16L and 16R are not interfered with by other structures on the automotive vehicle 6. In addition, experience has also demonstrated that the two ultrasonic sensors 15L and 15R be preferably spaced apart and situated at opposite sides of the frontal periphery 11F of the automotive vehicle 6, one on each side of the centrally mounted radar sensor 12. In this way, the immediate areas not sensed on both sides of the radar sensor's beam 13 are properly sensed as well. As a result, the entire frontal periphery 11F of the automotive vehicle 6 is provided with "blanket" sensing coverage so that other objects, either stationary or moving, in the vehicle's potential forward drive path are preemptively sensed and proactively addressed by the system 5 on board the vehicle 6.

Figure 2A:
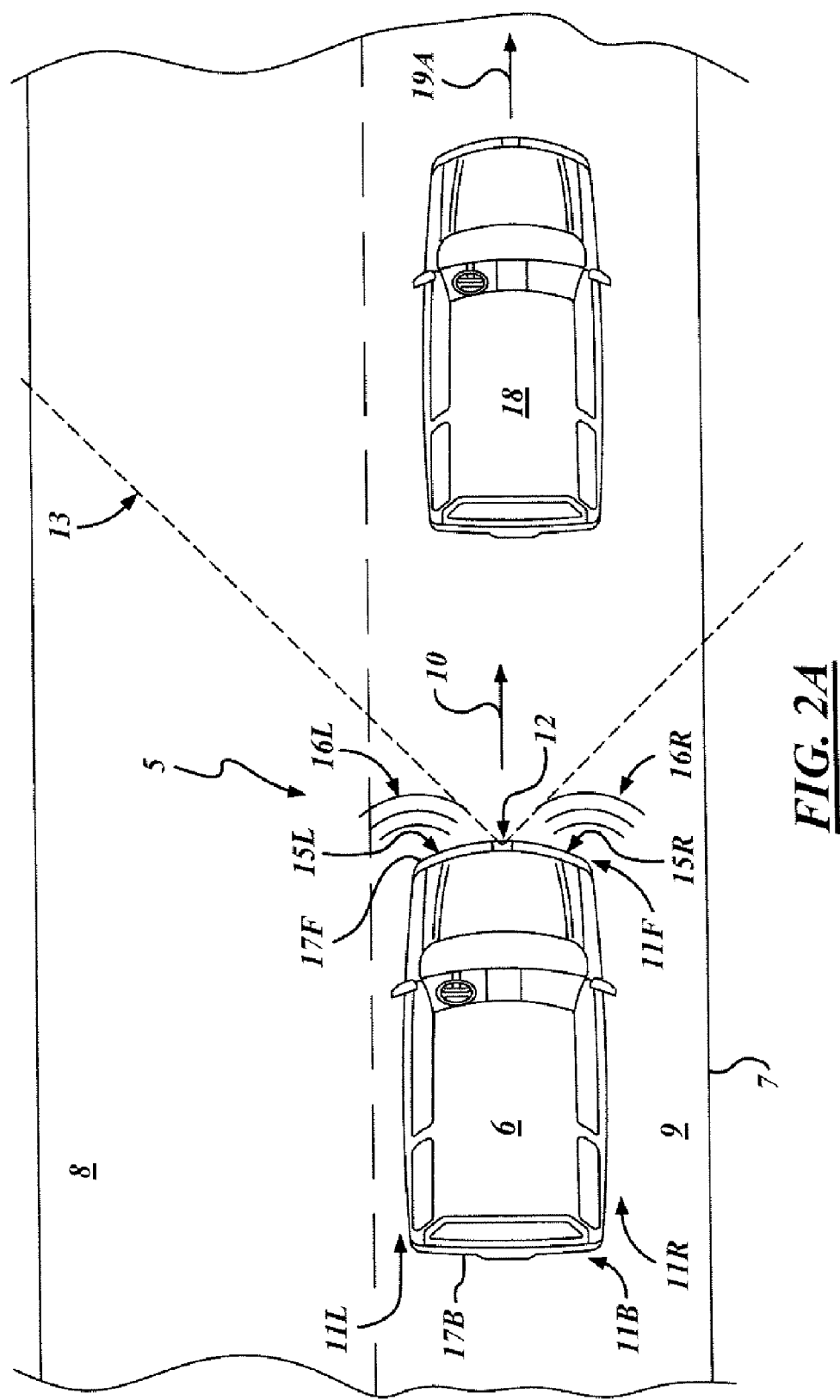
FIG. 2A is an aerial view wherein the automotive vehicle of FIG. 1 is facing a potential collision with the back end of a vehicle that is moving slowly or disabled.

FIG. 2A is an aerial view wherein the automotive vehicle 6 is traveling on the road 7 at a significant rate of speed such as, for example, greater than 10 miles per hour (mph) or 16 kilometers per hour (kph). In this view, the automotive vehicle 6 is particularly facing a potential collision with the back end of a vehicle 18 that is moving slowly in a direction 19A or that is altogether disabled and stopped. As demonstrated in this view, the positioning of the radar sensor 12 at the center of the frontal periphery 11F of the automotive vehicle 6 ensures that the vehicle 18, which is in the potential forward drive path of the vehicle 6, is successfully sensed within the field of view (FOV) of the radar sensor's beam 13. In preemptively sensing the vehicle 18 in this manner, the on-board vehicular system 5 can then timely assess the potential collision situation, tailor an appropriate response to the situation, and selectively operate the collision countermeasure system 35 so as to proactively address the situation. If, in a somewhat analogous encounter, the automotive vehicle 6 alternatively approaches the vehicle 18 at a low rate of speed (for example, less than 10 mph) as in a parking situation, then both the radar sensor 12 and the two ultrasonic sensors 15L and 15R operate to cooperatively sense the position of the vehicle 18. In preemptively sensing the vehicle 18 in this alternative manner, the on-board vehicular system 5 can then timely assess the situation, tailor an appropriate response to the situation, and selectively operate the parking assistance system 32 so as to proactively address the situation.

Figure 2B:
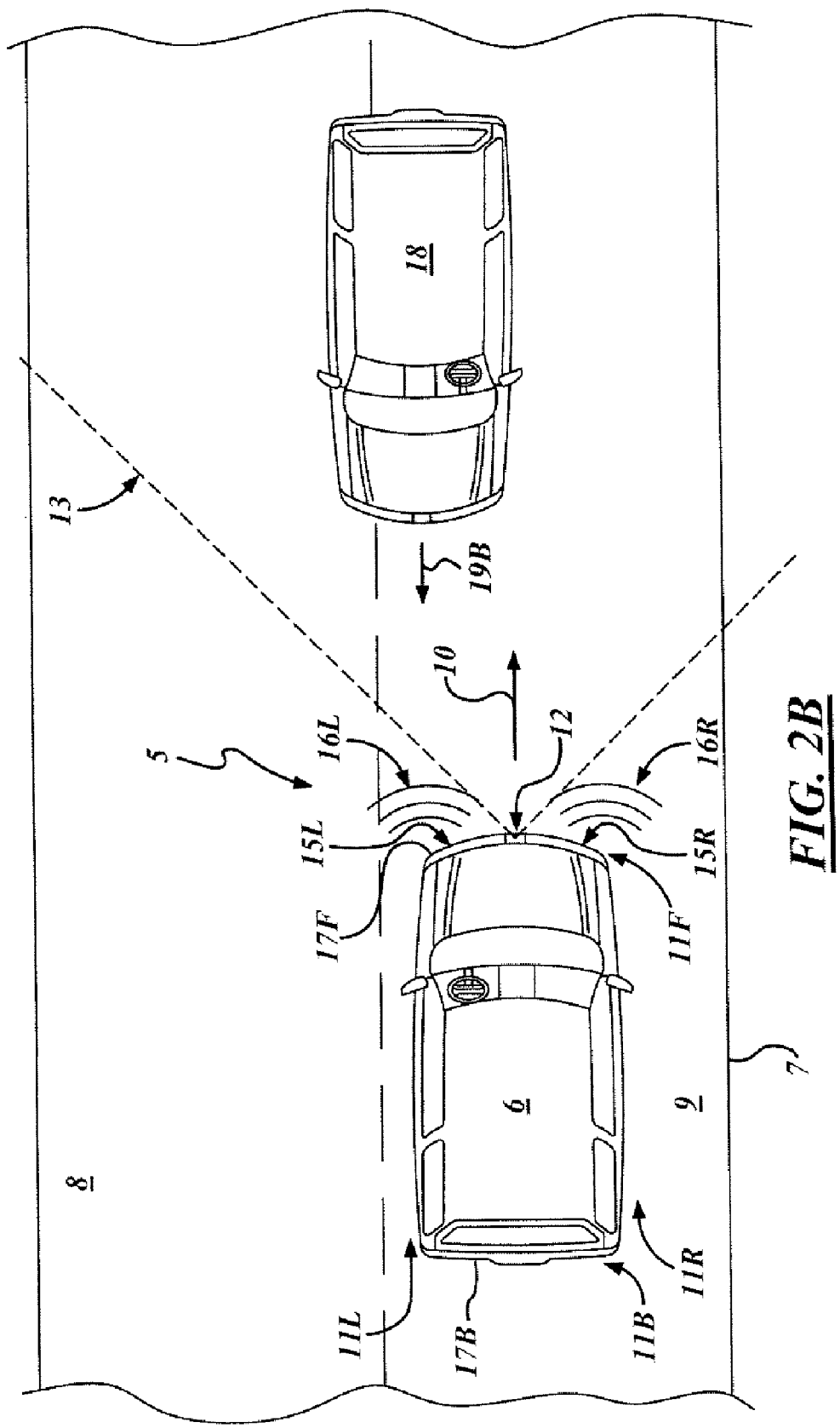
FIG. 2B is an aerial view wherein the automotive vehicle of FIG. 1 is facing a potential head-on collision with an oncoming vehicle that has drifted from an opposing lane.

FIG. 2B is another aerial view wherein the automotive vehicle 6 is traveling on the road 7 at a significant rate of speed. In this view, the automotive vehicle 6 is particularly facing a potential head-on collision with the vehicle 18 that is drifting from opposing lane 8 and now oncoming in a direction 19B. As demonstrated in this view, the positioning of the radar sensor 12 at the center of the frontal periphery 11F of the automotive vehicle 6 again ensures that the vehicle 18 is successfully sensed within the field of view (FOV) of the radar sensor's beam 13, even when the oncoming vehicle 18 has merely drifted from another lane (i.e., opposing lane 8). In preemptively sensing the vehicle 18 in this manner, the on-board vehicular system 5 can then selectively operate the collision countermeasure system 35 to address the situation. In a somewhat analogous low-speed encounter in, for example, a parking situation, both the radar sensor 12 and the two ultrasonic sensors 15L and 15R operate to cooperatively sense the position of the vehicle 18. In preemptively sensing the vehicle 18 in this alternative manner, the on-board vehicular system 5 can then selectively operate the parking assistance system 32 to address the situation.

FIG. 2C is still another aerial view wherein the automotive vehicle 6 is traveling on the road 7 at a significant rate of speed. In this view, the automotive vehicle 6 is particularly facing a potential collision with the front end of the vehicle 18 that is out of control and now oncoming in an oblique direction 19C. As demonstrated in this view, the positioning of the radar sensor 12 at the center of the frontal periphery 11F of the automotive vehicle 6 still again ensures that the vehicle 18 is successfully sensed within the field of view (FOV) of the radar sensor's beam 13, even when the vehicle 18 is oncoming from an oblique angle. In preemptively sensing the vehicle 18 in this manner, the on-board vehicular system 5 can then selectively operate the collision countermeasure system 35 to address the situation. In a somewhat analogous low-speed encounter in, for example, a parking situation, both the radar sensor 12 and the two ultrasonic sensors 15L and 15R operate to cooperatively sense the position of the vehicle 18. In preemptively sensing the vehicle 18 in this alternative manner, the on-board vehicular system 5 can then selectively operate the parking assistance system 32 to address the situation.

FIG. 3 is a block diagram of the overall system 5 on board the automotive vehicle 6. In the figure, the data processing system 20 is particularly highlighted and shown to include one or more microelectronic processors (microprocessors). Although other locations on board the automotive vehicle 6 may also be suitable, the data processing system 20 is preferably mounted within the engine compartment, under the dashboard, or together with a local restraint control module.

As illustrated in FIG. 3, the data processing system 20 is in direct or indirect electrical communication with the radar sensor 12, the two ultrasonic sensors 15L and 15R, the vehicle dynamics detection system 23, the occupant information system 28, and one or more impact sensors 43 on board the automotive vehicle 6. In addition, the data processing system 20 is also in direct or indirect electrical communication with the collision countermeasure system 35 and the parking assistance system 32 aboard the vehicle 6. Pursuant to the present invention, any such electrical communication or connection may be established in a hardwired, wireless, or combinational fashion.

Configured as such, the data processing system 20 is thereby operable to directly or indirectly receive various sensor data from the radar sensor 12, the two ultrasonic sensors 15L and 15R, the various sensors of the vehicle dynamics detection system 23, the various sensors of the occupant information system 28, and the one or more impact sensors 43. Upon receiving such various sensor data, the data processing system 20 is then operable to selectively process the sensor data. After processing the sensor data, the data processing system 20 is then operable to accordingly transmit various operating instructions to the various safety systems of the collision countermeasure system 35 and the visual/auditory systems of the parking assistance system 32 so as to operate all such systems in a selective manner.

In FIG. 3, the vehicle dynamics detection system 23 operates to provide timely feedback information and data relating to the operational dynamics and conditions of the automotive vehicle 6. To provide such information and data, the vehicle dynamics detection system 23 generally includes many various on-board sensors. Pursuant to the present invention, the vehicle dynamics detection system 23 preferably includes at least a vehicle speed sensor 24, a yaw rate sensor 25, and a steering wheel angle sensor 26. In addition thereto, the vehicle dynamics detection system 23 may also include various other on-board sensors 27 as well. Such other sensors 27 may include, for example, a longitudinal acceleration sensor, a lateral acceleration sensor, a pitch rate sensor, a crankshaft position sensor, a camshaft position sensor, a throttle position sensor, a transaxle/transmission sensor, a braking sensor, et cetera.

The vehicle speed sensor 24 may be one of any variety of vehicle speed sensors known to those skilled in the art. For example, in one practicable embodiment, the vehicle speed sensor 24 may include a separate electromagnetic wheel speed sensor for each individual wheel rotatably mounted on the automotive vehicle 6. In general, such wheel speed sensors serve to measure the individual rotational speeds of the wheels with which they are associated. The wheel speed sensors typically interoperate with toothed-type wheel sensor rotors or "trigger wheels," such as those employed in anti-lock brake and traction control systems, which are mounted on the individual wheel assemblies so as to correspondingly rotate along with the wheels themselves. In addition to such wheel speed sensors, the vehicle speed sensor 24 may also include an electronic controller for collecting wheel speed data that is electrically communicated from the individual wheel speed sensors. Upon receiving all such wheel speed sensor data, the electronic controller then utilizes a speed-averaging algorithm to calculate and ultimately determine the overall speed of the automotive vehicle 6.

The yaw rate sensor 25 may similarly be of any variety of yaw rate sensors known to those skilled in the art. In general, the yaw rate sensor 25 serves to determine the yaw rate of the automotive vehicle 6 about its own center of gravity, that is, the tendency of the vehicle 6 to rotate about an axis that is associated with the vehicle's center of gravity and defined normal (i.e., perpendicular) to the surface of the road 7. Although the yaw rate sensor 25 is preferably situated and mounted at the vehicle's center of gravity, those skilled in the art understand that the yaw rate sensor 25 may alternatively be situated in various other locations aboard the vehicle 6 and be mathematically translated back to the vehicle's center of gravity via computational algorithms executed by either the yaw rate sensor 25 itself or an associated electronic controller in electrical communication therewith.

The steering wheel angle sensor 26 may also be of any variety of steering wheel angle sensors known to those skilled in the art. In general, the steering wheel angle sensor 26 serves to detect the rotational position of the steering wheel (hand wheel) and ultimately therefore the steering angle of the front wheels on the automotive vehicle 6. In one practicable embodiment, the steering wheel angle sensor 26 is situated and mounted within the steering column of the automotive vehicle 6. In other practicable embodiments, a steering angle sensor may be situated in the gearbox housing of the front steering system to serve as an additional or alternative means for determining the steering angle of the steering wheel and/or front wheels.

In FIG. 3, the occupant information system 28 operates to provide timely feedback information and data relating to the presence, body positions, and/or weight distributions of the driver and any other occupants (passengers) within the automotive vehicle 6. To provide such information and data, the occupant information system 28 generally includes many various on-board sensors. Pursuant to the present invention, the occupant information system 28 preferably includes one or more various position sensors 29, weight sensors 30, and/or other sensors 31.

The position sensors 29 may include, for example, seat position sensors, backrest position sensors, headrest position sensors, armrest position sensors, a rear view mirror position sensor, side view mirror position sensors, seat belt status sensors, and/or vision system cameras. The seat belt status sensors may particularly include sensors for determining the various positions and/or tensions of the seat belts within the automotive vehicle 6. The vision system may include data processing means for executing triangulation algorithms on data provided by the cameras so as to confirm the presence, position, and size of each person within the vehicle 6.

The weight sensors 30, in turn, may include pressure sensors that are situated in various locations within the cabin of the automotive vehicle 6. Such various locations may include, for example, in the bottom and back cushions of each seat, in the headrest cushions of each seat, in the armrest cushions of each seat, and/or in the floor mats at the foot of each seat.

In addition to both the position sensors 29 and the weight sensors 30, the occupant information system 28 may also include one or more other types of sensors 31. Such other sensors 31 may include, for example, one or more braking system sensors such as a brake pedal position sensor and/or a brake pedal pressure sensor.

In FIG. 3, the parking assistance system 32 operates to assist a driver in the low-speed maneuvering of the automotive vehicle 6 safely around other objects and vehicles situated or moving in close proximity thereto. To assist the driver, the parking assistance system 32 particularly includes one or more in-cabin indicators or alerting devices. These indicators or alerting devices serve to inform the driver as to how close the vehicle 6 is to any one or more objects or vehicles about the vehicle 6 and/or the predicted time-to-impact therewith. Pursuant to the present invention, such indicators or alerting devices preferably include a visual display system 33 and an auditory alert system 34.

The visual display system 33, in one practicable embodiment, includes a video screen for visually informing the driver of the relative position of any nearby object or vehicle sensed by the radar sensor 12, the driver-side ultrasonic sensor 15L, and/or the passenger-side ultrasonic sensor 15R. For convenient observation by the driver, the visual display system 33 is preferably mounted in or on the dashboard console or the cabin ceiling of the automotive vehicle 6. In other practicable embodiments, the visual display system 33 may additionally or alternatively include one or more illuminable lights or light-emitting diodes (LEDs). Such lights or LEDs preferably have means for flashing on and off at varying frequencies that directly correspond to the sensed degree of closeness (i.e., relative distance or range) or the predicted time-to-impact between the automotive vehicle 6 and a sensed object or vehicle.

The auditory alert system 34 preferably includes an audio system of one or more acoustic transducers, speakers, or electronic beepers. In embodiments including at least one electronic beeper, each beeper preferably has means for beeping on and off at a varying frequency that directly corresponds to the sensed degree of closeness or the predicted time-to-impact between the automotive vehicle 6 and a sensed object or vehicle. To ensure that the driver properly hears any such beeping, the auditory alert system 34 is preferably situated and mounted, at least in large part, within the vehicle's cabin.

In FIG. 3, the collision countermeasure system 35 operates to arm, deploy, or activate safety systems on board the automotive vehicle 6 in preemptive anticipation of, or in immediate reactive response to, a collision between the vehicle 6 and another object or vehicle. In this way, the collision countermeasure system 35 attempts to counteract an anticipated or actualized collision event so as to ensure the safety of the driver and any other occupant in the vehicle 6. To ensure the safety of persons on board, the collision countermeasure system 35 generally includes many various on-board safety systems. Some of these various safety systems may include, for example, an airbag system 36, a bumper system 37, a seat belt system 38, a braking assistance system 39, an energy absorption system 40, a knee bolster system 42, and/or other safety systems 41.

The airbag system 36 preferably includes various inflatable airbags that are situated in various locations inside or outside the automotive vehicle 6. Internal airbags are primarily intended for protecting the driver and any passengers within the vehicle 6 in the event of a collision. Such internal airbags may include, for example, a driver-side airbag located in the steering wheel cover, a front passenger-side airbag located in the dashboard, side-impact airbags located in the side door panels or in the outer edges of the seats, drop-down window (or "curtain") airbags located above the side windows, and/or rear passenger airbags located in the backing of the front seats. External airbags, on the other hand, may be intended to protect persons inside or outside the vehicle 6, or both, depending on the particular type and location of a given external airbag. Such external airbags may include, for example, bumper airbags located on the front bumper 17F or back (rear) bumper 17B of the vehicle 6, airbags located on the front end of the vehicle 6, and/or airbags located on the front hood of the vehicle 6.

The bumper system 37 includes both a front bumper 17F that is mounted on the front end of the automotive vehicle 6 and a back (or rear) bumper 17B that is mounted on the back end of the vehicle 6. In general, the bumper system 37 operates to absorb shock during impact in a collision event. In this way, the bumper system 37 attempts to minimize both damage to the vehicle 6 itself and injury to persons within the vehicle 6. The bumpers 17F and 17B may be of various different types. In one embodiment, for example, the bumpers 17F and 17B may particularly be extendable/retractable type bumpers. In such an embodiment, each of the bumpers 17F and 17B can be selectively deployed into an extended position in preemptive anticipation of a collision. Whenever a collision is not anticipated, each of the bumpers 17F and 17B can be returned to a retracted position. In another embodiment, the bumpers 17F and 17B may alternatively be height variable type bumpers. In such an embodiment, each of the bumpers 17F and 17B can be selectively adjusted to a particular height in preemptive anticipation of a collision. In this way, the bumper system 37 on the vehicle 6 is vertically matched up with the determined height of an object or vehicle sensed just prior to collision impact.

The seat belt system 38 includes multiple fastenable seat belts located in, on, or about the driver and passenger seats within the automotive vehicle 6. In general, each seat belt, when properly fastened about a seated person, serves to hold the person in his seat during a collision. In this way, the person is prevented from being ejected from the seat upon collision impact and sustaining injury. In a preferred embodiment, each seat belt in the system 38 is individually equipped with a motorized pretensioner. In this way, if a collision with a sensed object or vehicle is anticipated, each pretensioner can be preemptively activated to remove the slack in its associated seat belt so as to prevent ejection of a seated person during actual collision impact. In the same or another embodiment, each seat belt in the seat belt system 38 may additionally or alternatively be equipped with a load-limiting seat belt controller.

The braking assistance system 39 preferably includes a brake pedal actuation controller. In general, the brake pedal actuation controller serves to monitor the application of vehicle brakes so as to slow the automotive vehicle 6 down in preemptive anticipation of a collision and thereby reduce collision impact velocity. In addition, the brake pedal actuation controller also serves to prevent uncontrolled skidding during braking.

The energy absorption system 40, in a preferred embodiment, includes one or more structural stiffeners that are variously located and incorporated within the body of the automotive vehicle 6. The energy absorption system 40 may particularly include passive and/or adaptive type structural stiffeners. In an adaptive type energy absorption system, the stiffness of each structural stiffener is adaptively and individually adjusted according to the particular area of the vehicle 6 that is sensed to have been suddenly impacted during a collision.

The knee bolster system 42, in a preferred embodiment, includes one or more thick resilient (for example, plastic) panels mounted on the lower portion of the vehicle's dash so as to cover the dash's metal frame. Mounted as such, the knee bolster system 42 serves to protect the driver's and any front passenger's knees from being injured in the event of a collision. In addition, the knee bolster system 42 also serves to prevent the driver and any front passenger from sliding under an airbag that is deployed during a collision event.

Other safety systems 41 that may optionally be included in the collision countermeasure system 35 are numerous. Some of such other safety systems 41 may include, for example, a steering column position controller, head restraint position controllers, a vehicle suspension height adjustment (nose-dipping) controller, an acceleration pedal position controller, a load-limiting acceleration pedal controller, a load-limiting steering angle controller, a speed-limiting steering angle controller, a transmission controller, a chassis system controller, and/or a fuel pump shut-off controller.

The impact sensor(s) 43, in a preferred embodiment, includes a number of inertial type sensors situated in various locations on board the automotive vehicle 6. Such inertial type sensors may be, for example, magnet-and-ball sensors or accelerometers. In general, each impact sensor 43 operates to detect a rapid change in vehicle speed or velocity, such as when the automotive vehicle 6 is forced to rapidly decelerate during a collision. In this way, the impact sensor 43 serves as means for sensing an actual collision event so that some of the reactive type on-board safety systems (for example, certain airbags) in the collision countermeasure system 35 can be timely triggered and activated. To ensure timely activation of these safety systems, each impact sensor 43 is preferably located at the periphery 11 of the vehicle 6, and most preferably at the frontal periphery 11F. For example, one or more impact sensors 43 may be mounted on or within the vehicle's front bumper 17F and/or back bumper 17B, at the vehicle's left periphery 11L and/or right periphery 11R, proximate the radiator support system, and/or in the vehicle's engine compartment.

As further illustrated in FIG. 3, the radar sensor data and the ultrasonic sensor data received by the data processing system 20 are generally processed in two stages 21 and 22. In the first processing stage 21, the radar sensor data and the ultrasonic sensor data are generally selectively processed and sorted into at least one of two data categories. The two data categories are generally predefined as (1) data utile for collision prediction purposes and (2) data utile for parking assistance purposes. During this first processing stage 21, if the automotive vehicle 6 is sensed and determined to be traveling at an average speed that is greater than an internally preset or predetermined parking assistance speed limit (for example, greater than 10 mph or 16 kph), the radar sensor data is selectively processed by the system 20 so as to extract any data that may be useful for collision prediction purposes. The ultrasonic sensor data, in such a scenario, is largely discarded. If, on the other hand, the vehicle 6 is sensed and determined to be traveling at an average speed that is less than the predetermined parking assistance speed limit, the radar sensor data and the ultrasonic sensor data are selectively aggregated and sorted by the system 20 through the use and execution of a data fusion algorithm. In this scenario, the radar sensor data and the ultrasonic sensor data are generally processed together, in an aggregated or commingled fashion, so as to extract any data that may be useful for parking assistance purposes.

In the second processing stage 22, the extracted collision prediction data or parking assistance data is generally processed so as to help determine operating instructions for the collision countermeasure system 35 or the parking assistance system 32. Determination of these operating instructions is generally achieved by the system 20 through the use and execution of various decision-making algorithms. In addition to the collision prediction data or parking assistance data obtained from the radar sensor data and/or the ultrasonic sensor data, additional sensor data received by the system 20 from the various sensors of the vehicle dynamics detection system 23 and/or the occupant information system 28 is also selectively processed by the decision-making algorithms so as to ultimately determine the operating instructions. In the particular scenario wherein the vehicle 6 is traveling at an average speed greater than the predetermined parking assistance speed limit, the collision prediction data obtained from the radar sensor data is processed to help determine operating instructions for the various safety systems of the collision countermeasure system 35. The parking assistance system 32, in this scenario, is largely left dormant and inactive. On the other hand, in the particular scenario wherein the vehicle 6 is traveling at an average speed less than the predetermined parking assistance speed limit, the parking assistance data obtained from the aggregated radar sensor data and ultrasonic sensor data is processed to help determine operating instructions for the visual/auditory systems of the parking assistance system 32.

Figure 4A:
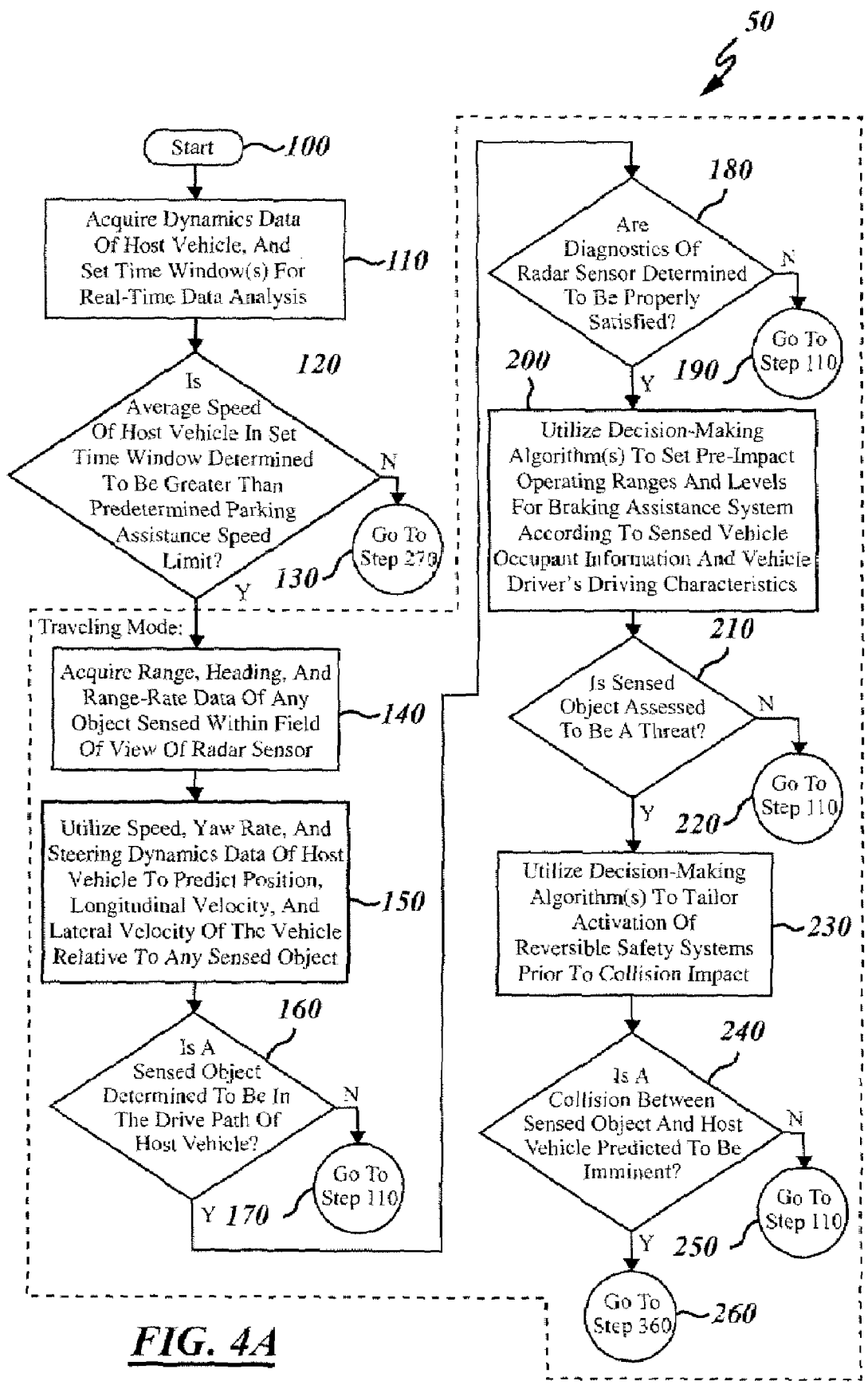
FIG. 4A is part of a flowchart wherein method steps executed by the data processing system of FIG. 3 are set forth.
Figure 4B:
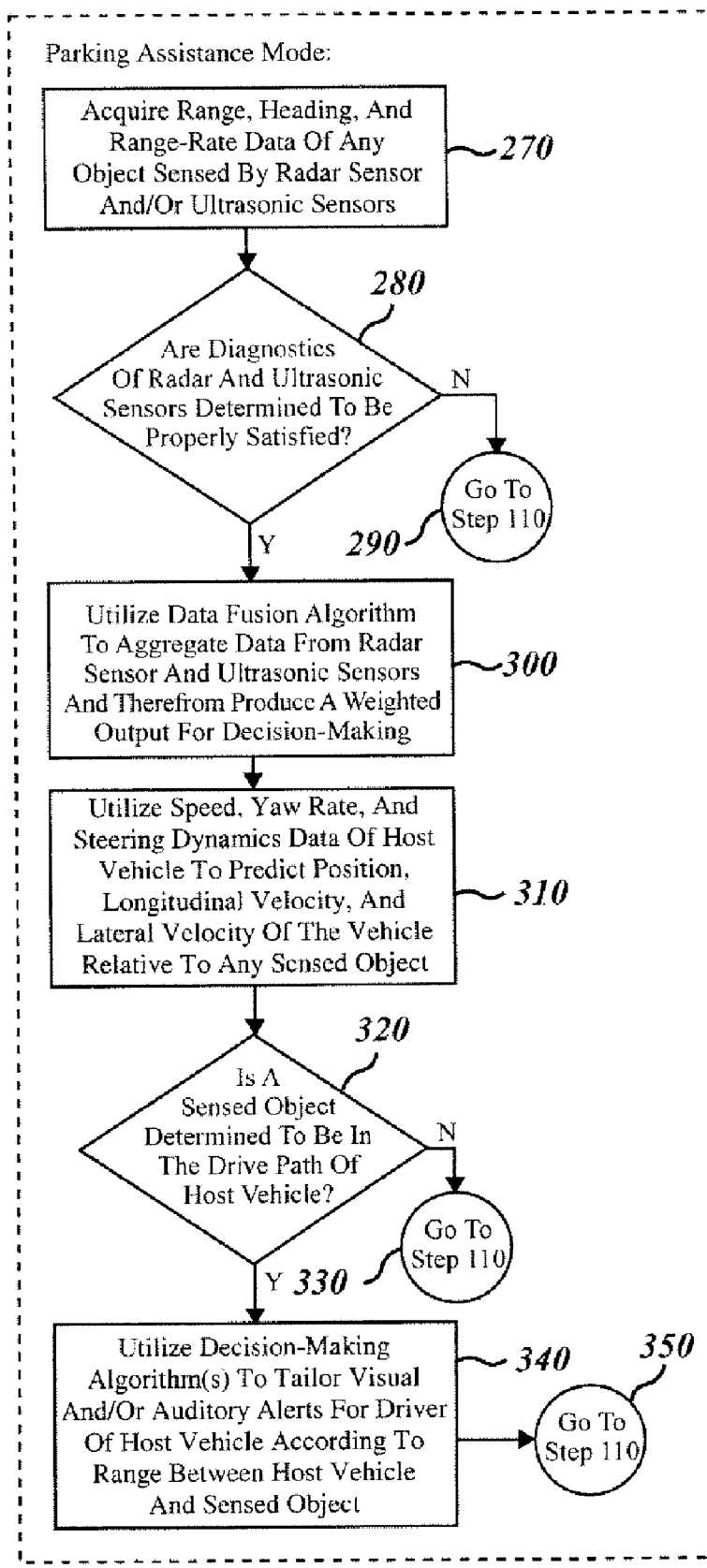
FIG. 4B is a continuation of the flowchart in FIG. 4A.
Figure 4C:
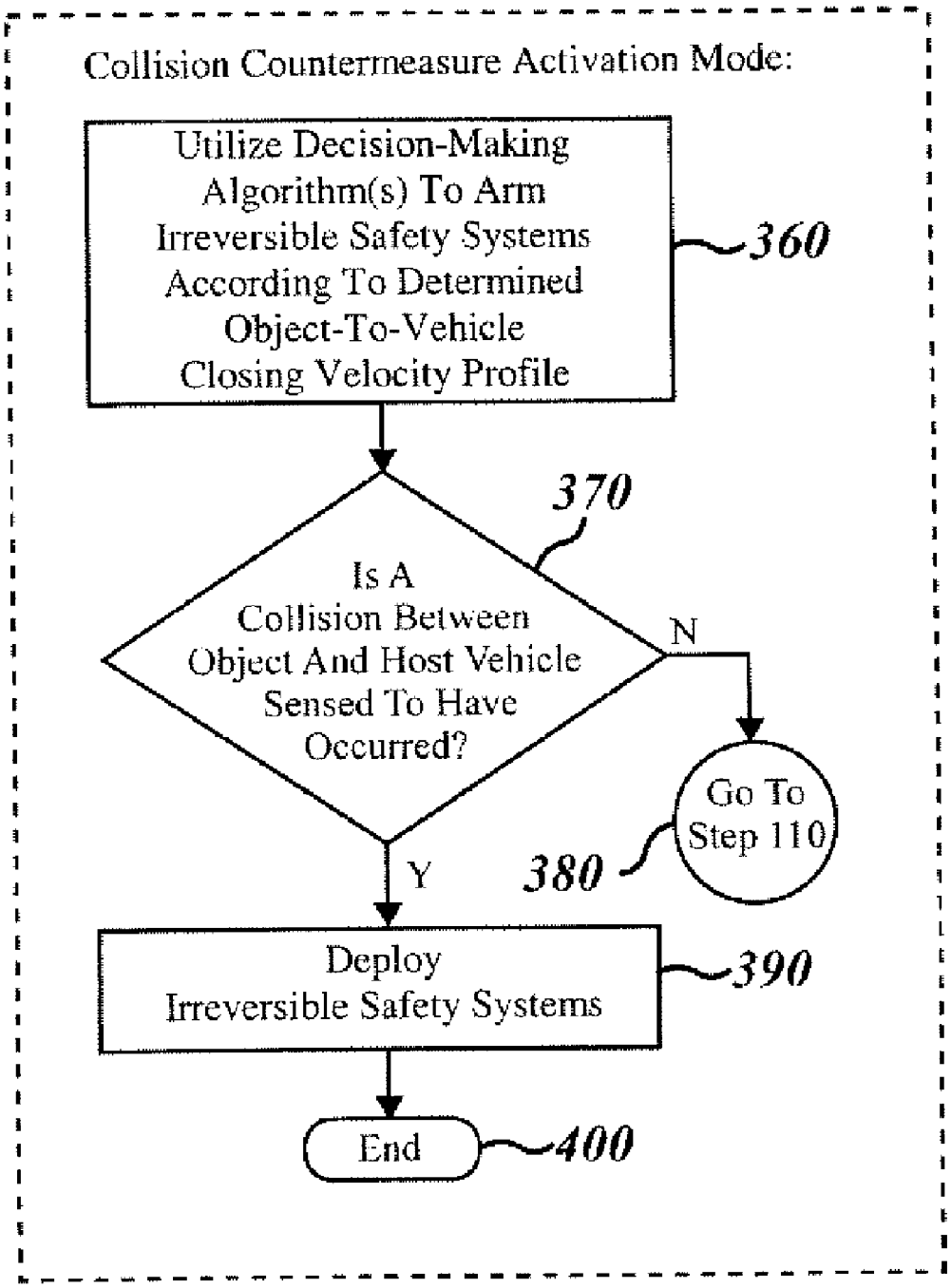
FIG. 4C is a continuation of the flowchart in FIG. 4A.

FIGS. 4A, 4B, and 4C co-illustrate a multi-section flowchart wherein method steps primarily executed by the data processing system 20 during operation of the system 5 on board the automotive vehicle 6 are set forth. In general, the method steps are performed and controlled by one or more executable programs, sub-routines, and/or algorithms that are pre-stored in one or more electronic memories associated with the system 20. In brief, FIG. 4A highlights method steps executed by the data processing system 20 when the vehicle 6 is operating in a "traveling mode." FIG. 4B, in turn, highlights method steps executed by the data processing system 20 when the vehicle 6 is operating in a "parking assistance mode." FIG. 4C, lastly, highlights method steps executed by the data processing system 20 when the vehicle 6 is operating in a "collision countermeasure activation mode." A detailed description of the overall program-controlled method 50 set forth in FIGS. 4A, 4B, and 4C is as follows.

In step 100 of FIG. 4A, when a driver initially starts up the automotive "host" vehicle 6, the on-board vehicular system 5, along with the data processing system 20, is thereby initialized.

In step 110, as the automotive vehicle 6 begins to move, the data processing system 20 then operates to acquire various vehicle dynamics data, in the form of sensor data, from various sensors of the vehicle dynamics detection system 23. In this same step, the data processing system 20 also sets up one or more time windows for timely analysis of the acquired vehicle dynamics data.

In step 120, the data processing system 20 selectively processes the vehicle dynamics data so as to calculate and determine the average speed of the automotive vehicle 6 in a set time window. Upon doing so, the data processing system 20 then mathematically compares the average speed of the vehicle 6 in the set time window to a predetermined parking assistance speed limit (for example, 10 mph or 16 kph) that has been pre-stored in an electronic memory associated with the system 20. If, based on the comparison, the average speed of the vehicle 6 is determined to be less than the predetermined parking assistance speed limit, the vehicle 6 is thus determined to be operating in a "parking assistance mode." In such a case, the data processing system 20 then prepares to execute step 130. If, on the other hand, the average speed of the vehicle 6 is determined to be greater than the predetermined parking assistance speed limit, the vehicle 6 is thus determined to be operating in a "traveling mode." In this case, the data processing system 20 instead prepares to execute step 140.

In step 130, the data processing system 20 "jumps" forward to step 270 in FIG. 4B so as to continue execution of the program-controlled method 50.

In step 140, with the automotive vehicle 6 operating in a traveling mode, the data processing system 20 operates to acquire sensor data from the radar sensor 12. Upon acquiring the radar sensor data, the data processing system 20 then processes the data to determine whether an object (for example, a sizeable animal, significant road debris, a remote vehicle, et cetera) has been sensed within the radar sensor's field of view (FOV). If an object has indeed been sensed, the data processing system 20 then continues to acquire and process sensor data from the radar sensor 12 so as to determine the range (i.e., distance), heading, and range rate (speed) of the sensed object relative to the automotive vehicle 6 for collision prediction purposes.

In step 150, if an object was indeed sensed in previous step 140, the data processing system 20 then collects sensor data acquired from the vehicle speed sensor 24, the yaw rate sensor 25, and the steering wheel angle sensor 26 in previous step 110 along with the object's range, heading, and range-rate data acquired in previous step 140. Upon collecting all such data, the data processing system 20 then utilizes the data to computationally determine and predict the position, longitudinal velocity, and lateral velocity of the automotive vehicle 6 relative to the sensed object in both the present and upcoming moments. In a preferred embodiment, the data processing system 20 is able to accurately determine relative velocities between the vehicle 6 and a sensed object of up to at least 40 mph or 64 kph.

In step 160, if no object was sensed within the radar sensor's field of view in previous step 140, the data processing system 20 then prepares to execute step 170. If, on the other hand, an object was indeed sensed in previous step 140, the data processing system 20 then determines whether the sensed object is in the anticipated drive path of the automotive vehicle 6 based upon the relative trajectories of both the vehicle 6 and the sensed object as determined and predicted in previous step 150. If the sensed object is determined to not be within the vehicle's anticipated drive path, the data processing system 20 then prepares to execute step 170. If, in the alternative, the sensed object is determined to be within the vehicle's anticipated drive path, the data processing system 20 then instead prepares to execute step 180.

In step 170, the data processing system 20 jumps back to step 110 so as to continue execution of the program-controlled method 50.

In step 180, the data processing system 20 acquires selected performance data (i.e., diagnostics data) from the radar sensor 12 to check and determine whether the sensor 12 is operating properly. Upon receiving the diagnostics data, the data processing system 20 then compares the data to preferred performance data or data ranges (i.e., specifications) that are pre-stored in an electronic memory associated with the system 20. In this way, the system 20 determines whether the radar sensor's diagnostics data are within the specifications and thus whether the radar sensor 12 is operating satisfactorily. If, based on the comparison, the data processing system 20 determines that the radar sensor 12 is not operating satisfactorily, the system 20 then concludes that the radar sensor data acquired in previous step 140 is not reliable. In such a case, the data processing system 20 then prepares to execute step 190. If, on the other hand, the system 20 determines that the radar sensor 12 is operating satisfactorily, the system 20 then concludes that the radar sensor data acquired in previous step 140 is reliable. In this case, the data processing system 20 instead prepares to execute step 200.

In step 190, the data processing system 20 jumps back to step 110 so as to continue execution of the program-controlled method 50.

In step 200, the data processing system 20 operates to acquire on-board occupant information, in the form of sensor data, from various sensors of the occupant information system 28. In addition, the data processing system 20 also operates to selectively collect sensor data acquired from the vehicle dynamics detection system 23 in previous step 110 so as to obtain information relating to the driving characteristics of the vehicle's driver. Upon collecting all such occupant information data and driving characteristics data, the data processing system 20 then processes the data, along with selected other data collected in previous steps, using one or more decision-making algorithms so as to determine operating instructions for the braking assistance system 39 of the collision countermeasure system 35. In general, such operating instructions dictate the setting of pre-impact operating ranges and levels for the braking assistance system 39. After determining the operating instructions, the instructions are preferably transmitted to the braking assistance system 39 with a lead time of at least 300 milliseconds (ms) prior to anticipated collision impact. In this way, the brake pedal actuation controller of the braking assistance system 39 is given ample time to begin slowing the automotive vehicle 6 down in preemptive anticipation of a collision so as to reduce impact velocity.

In step 210, the data processing system 20 utilizes the position, longitudinal velocity, and lateral velocity of the automotive vehicle 6 relative to the sensed object, as predicted in previous step 150, to carefully determine the risk or likelihood that the vehicle 6 will actually collide with the sensed object. The data processing system 20 makes such a determination by processing the vehicle's predicted position, longitudinal velocity, and lateral velocity information with threat assessment algorithms. Though adapted for specific use with the present invention, the threat assessment algorithms are largely conventional. As such, the threat assessment algorithms generally serve to estimate or predict quantities such as time-to-collision and collision probability confidence values. If, based on such an assessment, the data processing system 20 determines that the vehicle 6 is not likely to collide with the sensed object, the system 20 then prepares to execute step 220. If, in the alternative, the system 20 determines that the vehicle 6 is likely to collide with the object, the system 20 then instead prepares to execute step 230.

In step 220, the data processing system 20 jumps back to step 110 so as to continue execution of the program-controlled method 50.

In step 230, the data processing system 20 selectively processes the data acquired in previous steps with one or more decision-making algorithms to thereby tailor and determine operating instructions for the various safety systems of the collision countermeasure system 35. In transmitting such tailored operating instructions to the various safety systems prior to anticipated collision impact, the data processing system 20 is thereby able to selectively arm, deploy, and/or activate the reversible safety systems at various prescribed times and on individual bases. In this way, the data processing system 20 essentially implements a unique counteracting response to each anticipated collision event.

In step 240, based on the determined closing velocity (CV) between the automotive vehicle 6 and the sensed object, the data processing system 20 estimates or predicts the amount of time remaining until anticipated collision impact (i.e., time-to-impact). If, based on the predicted time-to-impact, the data processing system 20 determines that the anticipated collision is not sufficiently imminent for necessitating the arming or activation of irreversible safety systems, the system 20 then prepares to execute step 250. If, on the other hand, the system 20 determines that the anticipated collision is sufficiently imminent for necessitating the arming or activation of irreversible safety systems, the system 20 then instead prepares to execute step 260.

In step 250, the data processing system 20 jumps back to step 110 so as to continue execution of the program-controlled method 50.

In step 260, the data processing system 20 jumps forward to step 360 in FIG. 4C so as to continue execution of the program-controlled method 50.

In step 270 of FIG. 4B, with the automotive vehicle 6 operating in a parking assistance mode, the data processing system 20 operates to acquire sensor data from both the radar sensor 12 and the two ultrasonic sensors 15L and 15R so as to determine whether an object (for example, a parking lot structure, a garage structure, a parked vehicle, et cetera) has been sensed within the radar sensor's field of view (FOV) and/or in one or both of the ultrasonic sensors' sensing ranges. If an object has indeed been sensed, the data processing system 20 then continues to acquire such sensor data for thereby determining the range, heading, and range rate of the sensed object relative to the automotive vehicle 6. When operating in the parking assistance mode, such sensor data from both the radar sensor 12 and the ultrasonic sensors 15L and 15R is primarily collected for parking assistance purposes only.

In step 280, if an object was sensed in previous step 270, the data processing system 20 then acquires selected performance data (i.e., diagnostics data) from both the radar sensor 12 and the two ultrasonic sensors 15L and 15R to check and determine whether the sensors 12, 15L, and 15R are each operating properly. Upon receiving the diagnostics data, the data processing system 20 then compares the data to preferred performance data or data ranges (i.e., specifications) that are pre-stored in an electronic memory associated with the system 20. In this way, the system 20 determines whether the sensors' respective diagnostics data are within the specifications and thus whether the sensors 12, 15L, and 15R are each operating satisfactorily. If, based on the comparisons, one or more of the sensors 12, 15L, and 15R are determined by the system 20 to be operating satisfactorily, then sensor data associated with any such sensor is deemed reliable. If, on the other hand, one or more of the sensors 12, 15L, and 15R are determined by the system 20 to be operating unsatisfactorily, then sensor data associated with any such sensor is deemed to be unreliable. Given such, therefore, if at least one sensor both sensed an object in previous step 270 and is deemed to be operating satisfactorily, the system 20 then prepares to execute step 300. In all other cases, the system 20 then instead prepares to execute step 290.

In step 290, the data processing system 20 jumps back to step 110 in FIG. 4A so as to continue execution of the program-controlled method 50.

In step 300, any sensor data both acquired in previous step 270 and thereafter determined reliable in previous step 280 is further processed by the data processing system 20. If sensor data from the radar sensor 12 and also sensor data from one or both of the two ultrasonic sensors 15L and 15R have been deemed reliable in previous step 280, the data processing system 20 then particularly utilizes a data fusion algorithm to selectively aggregate the radar sensor data and the ultrasonic sensor data together and thereafter sort the aggregated data. In sorting the aggregated data, the data fusion algorithm determines the degree of usefulness of each individual data stream to ultimately produce a weighted output for use in primarily determining operating instructions for the visual/auditory systems of the parking assistance system 32.

In step 310, the data processing system 20 collects sensor data acquired from the vehicle speed sensor 24, the yaw rate sensor 25, and the steering wheel angle sensor 26 in previous step 110 along with the sensed object's range, heading, and range-rate data acquired in previous step 270. Upon collecting all such data, the data processing system 20 then utilizes the data to computationally determine and predict the position, longitudinal velocity, and lateral velocity of the automotive vehicle 6 relative to the sensed object in both the present and upcoming moments.

In step 320, the data processing system 20 determines whether the object sensed in previous step 270 is in the anticipated drive path of the automotive vehicle 6 based upon the relative trajectories of both the vehicle 6 and the sensed object as determined and predicted in previous step 310. If the sensed object is determined to not be within the vehicle's anticipated drive path, the data processing system 20 then prepares to execute step 330. If, in the alternative, the sensed object is determined to be within the vehicle's anticipated drive path, the data processing system 20 then instead prepares to execute step 340.

In step 330, the data processing system 20 jumps back to step 110 in FIG. 4A so as to continue execution of the program-controlled method 50.

In step 340, based on the determined closing velocity (CV) between the automotive vehicle 6 and the sensed object, the data processing system 20 estimates or predicts the amount of time remaining until possible impact (i.e., time-to-impact) with the object. In addition, the data processing system 20 also selectively processes the data acquired in previous steps with one or more decision-making algorithms so as to individually tailor and determine operating instructions for the visual/auditory systems of the parking assistance system 32. In transmitting such tailored operating instructions to the visual/auditory systems in the time window prior to anticipated impact with the sensed object, the data processing system 20 is thereby able to selectively operate the visual/auditory systems on individual bases so as to alert the driver within the vehicle 6 of potential impact with the sensed object. In a preferred embodiment, the indicators or alerting devices associated with the visual/auditory systems of the parking assistance system 32 are particularly activated or operated according to the degree of closeness (i.e., relative distance or range) and/or the predicted time-to-impact between the vehicle 6 and the sensed object. By timely alerting the driver in this manner, the driver has time to stop, redirect, or move the vehicle 6 so as to avoid impact.

In step 350, the data processing system 20 jumps back to step 110 in FIG. 4A so as to continue execution of the program-controlled method 50.

In step 360 of FIG. 4C, with the automotive vehicle 6 now operating in a collision countermeasure activation mode, the data processing system 20 operates to timely arm the irreversible safety systems of the collision countermeasure system 35, such as the airbag system 36. Arming of these irreversible safety systems is performed in accordance with both the decision-making algorithms executed in previous step 230 and the object-to-vehicle closing velocity profile determined for previous step 240. In arming the airbag system 36, the data processing system 20 electrically communicates operating instructions to one or more electronic controllers associated with the various airbags included in the overall system 36 so as to electrically "enable" the airbags for deployment should the anticipated collision actually occur.

In step 370, the data processing system 20 operates to determine whether an actual collision between the automotive vehicle 6 and the sensed object has occurred within an anticipated time window. Any actual collision between the vehicle 6 and the object is vicariously sensed by the data processing system 20 via one or more of the impact sensors 43. The anticipated time window is based on the predicted time-to-impact determined in previous step 240. Given such, if the data processing system 20 determines that a collision has not occurred within the anticipated time window, the system 20 then concludes that the vehicle 6 and the object missed each other. In such a case, the data processing system 20 then prepares to execute step 380. If, on the other hand, the system 20 determines that an actual collision has occurred within the anticipated time window, the system 20 then instead prepares to execute step 390.

In step 380, the data processing system 20 jumps back to step 110 in FIG. 4A so as to continue execution of the program-controlled method 50.

In step 390, with the data processing system 20 having determined in previous step 370 that an actual collision has occurred, the system 20 directs the irreversible safety systems of the collision countermeasure system 35 to be selectively deployed. In general, such irreversible safety systems are selectively deployed based upon (1) the magnitude of a collision (i.e., collision severity) and (2) the type of a collision (i.e., angle of impact) as predicted or determined by the data processing system 20. With regard to collision type, for example, the various airbags included within the airbag system 36 are selectively deployed according to the type of collision vicariously sensed and determined by the data processing system 20 via the impact sensors 43. Hence, in a largely head-on type of collision as in FIG. 2B, only certain frontal airbags may be deployed on board the automotive vehicle 6 while side airbags may not be deployed. In an oblique type of collision as in FIG. 2C, certain frontal airbags and certain side airbags may both be deployed. In addition, whether certain airbags are deployed may also depend on whether various vehicle seats are occupied as sensed by the various sensors of the occupant information system 28. Furthermore, airbag deployment characteristics may also be based on sensed and determined occupant information such as occupant size classification, occupant body position, and each occupant's seat belt wearing status.

In step 400, with the irreversible safety systems having been selectively deployed in previous step 390, the data processing system 20 directs the fuel pump shut-off controller of the collision countermeasure system 35 to immediately shut off the supply of fuel to the vehicle's engine. In this way, the engine is cut off, the automotive vehicle 6 is effectively disabled, and the leakage of fuel is prevented.

In summary, many inherent advantages and benefits are realized when implementing the above-described system 5 and its associated method 50 on board an automotive vehicle 6. Some of these advantages and benefits are briefly outlined as follows.

In implementing such an on-board vehicular system 5, a highly optimal balance between sufficiently wide object-sensing coverage and sufficiently low overall system cost is thereby successfully established. In particular, with the radar sensor 12 and the two ultrasonic sensors 15L and 15R situated and mounted on the automotive vehicle 6 as depicted in FIG. 1, the entire frontal periphery 11F of the vehicle 6 has blanket object-sensing coverage for both collision countermeasure and parking assistance purposes. In addition, by having the collision countermeasure system 35 and the parking assistance system 32 share use of the radar sensor 12 and by frequently utilizing a data fusion algorithm to process both radar sensor data and ultrasonic sensor data at the same time, the systems 35 and 32 are highly integrated. As a result, the overall system 5 necessitates fewer vehicle components, consumes and requires less on-board space, adds less weight to the vehicle 6, and results in lower manufacturing costs as compared to other conventional on-board vehicular systems with less integrated collision countermeasure and parking assistance capabilities.

In addition, by processing both radar sensor data and ultrasonic sensor data in a highly integrated fashion, the on-board vehicular system 5 and method 50 thus generally provide both data and pre-impact lead times that facilitate more reliable collision predictions for responsive decision-making. As a result, the system 5 is able to arm, deploy, and/or activate the various safety systems of the collision countermeasure system 35 in a highly selective and discriminating fashion. For example, with a lengthy pre-collision lead time, irreversible safety system devices such as airbags are armed and deployed in a highly selective and controlled manner so as to avoid unnecessary or inadvertent deployment. As an additional result, the system 5 is also able to maximize the effectiveness of some of the various safety systems of the collision countermeasure system 35. For example, with a lengthy pre-collision lead time, the brake pedal actuation controller of the braking assistance system 39 is given ample time to slow the automotive vehicle 6 down so as to significantly reduce the vehicle's impact velocity. As a further result, the system 5 is also able to operate the parking assistance system 32 in a timely and effective manner. For example, with a lengthy pre-impact lead time, the parking assistance system 32 has a sufficiently large window of time to effectively alert a vehicle driver of potential impact with a sensed object. Hence, the driver has ample time to stop, redirect, or move the vehicle 6 so as to avoid impact.

Furthermore, the on-board vehicular system 5 and method 50 can easily be adapted in alternative embodiments to operate in a collaborative manner with a largely conventional automotive backup assistance system. In one embodiment, for example, such a backup assistance system can be mounted aboard the automotive vehicle 6. The backup assistance system itself may include one or more radar sensors, ultrasonic sensors, vision sensors, or various combinations thereof. Each sensor of the backup assistance system is preferably mounted at or near the back of the vehicle 6, such as on the vehicle's back bumper 17B, so that each sensor generally faces backward or away from the vehicle's back periphery 11B. In addition to being mounted in this way, each such backward-facing sensor is also electrically connected, in either a hardwired or wireless fashion, to the data processing system 20 so as to establish electrical communication therewith. In such a configuration, each backward-facing sensor is operable, whenever the reverse gear of the automotive vehicle 6 is engaged, to sense the position of an object in the potential drive path of the vehicle 6 and also accordingly transmit sensor data to the data processing system 20. In a preferred embodiment, each backward-facing sensor can generally sense or detect a remote object at a distance of up to about 4.0 meters away from the back of the vehicle 6. The data processing system 20, in turn, is operable to receive the sensor data, selectively process the sensor data, and accordingly transmit operating instructions to the parking assistance system 32 so as to operate the system 32 in a selective manner. By incorporating such an automotive backup assistance system with rearward sensing capability in the on-board vehicular system 5 in this fashion, the overall functionality and effectiveness of the parking assistance system 32 is further enhanced for a vehicle driver's use.

While the present invention has been described in what are presently considered to be its most practical and preferred embodiments or implementations, it is to be understood that the invention is not to be limited to the particular embodiments disclosed hereinabove. On the contrary, the present invention is intended to cover various modifications and equivalent arrangements included within the spirit and scope of the claims appended hereinbelow, which scope is to be accorded the broadest interpretation so as to encompass all such modifications and equivalent structures as are permitted under the law.

What is claimed is:

1. A vehicular system for preemptively sensing an object in the potential drive path of an automotive vehicle and selectively operating both a collision countermeasure system and a parking assistance system aboard said automotive vehicle, said vehicular system comprising:

a radar sensor for being mounted aboard said automotive vehicle;

two ultrasonic sensors for being mounted aboard said automotive vehicle; and a data processing system for being mounted aboard said automotive vehicle, electrically connected to said radar sensor and said two ultrasonic sensors, and electrically connected to said collision countermeasure system and said parking assistance system;

wherein said radar sensor and said two ultrasonic sensors are operable to cooperatively sense the position of said object in said potential drive path of said automotive vehicle and accordingly transmit radar sensor data and ultrasonic sensor data to said data processing system; and wherein said data processing system is operable to receive said radar sensor data and said ultrasonic sensor data, selectively process said radar sensor data and said ultrasonic sensor data, and accordingly transmit operating instructions to said collision countermeasure system and said parking assistance system so as to operate said collision countermeasure system and said parking assistance system in a selective manner.

2. A vehicular system according to claim 1, wherein said radar sensor is operable to produce a beam having an angular field of view of at least 60 degrees.

3. A vehicular system according to claim 1, wherein said radar sensor is mounted at the center of the frontal periphery of said automotive vehicle.

4. A vehicular system according to claim 1, wherein said two ultrasonic sensors are spaced apart and mounted at opposite sides of the frontal periphery of said automotive vehicle.

5. A vehicular system according to claim 1, wherein said radar sensor and said two ultrasonic sensors are mounted at the frontal periphery of said automotive vehicle.

6. A vehicular system according to claim 1, wherein said radar sensor is mounted at the center of the frontal periphery of said automotive vehicle, and said two ultrasonic sensors are spaced apart and mounted at opposite sides of said frontal periphery of said automotive vehicle.

7. A vehicular system according to claim 1, wherein said data processing system comprises at least one microprocessor.

8. A vehicular system according to claim 1, wherein said data processing system has means for executing a data fusion algorithm to selectively aggregate and sort said radar sensor data and said ultrasonic sensor data.

9. A vehicular system according to claim 1, wherein said data processing system has means for executing decision-making algorithms to determine said operating instructions for said collision countermeasure system and said parking assistance system in accordance with said radar sensor data and said ultrasonic sensor data.

10. A vehicular system according to claim 1, said vehicular system further comprising:
 a backup assistance system including at least one backward-facing sensor mounted on the back of said automotive vehicle, electrically connected to said data processing system, and selected from the group consisting of a radar sensor, an ultrasonic sensor, and a vision sensor;
 wherein said at least one backward-facing sensor is operable, when the reverse gear of said automotive vehicle is engaged, to sense the position of said object in said potential drive path of said automotive vehicle and accordingly transmit sensor data to said data processing system; and
 wherein said data processing system is operable to receive said sensor data, selectively process said sensor data, and accordingly transmit operating instructions to said parking assistance system so as to operate said parking assistance system in a selective manner.

11. A method for preemptively sensing an object in the potential drive path of an automotive vehicle and selectively operating both a collision countermeasure system and a parking assistance system aboard said automotive vehicle, said method comprising the steps of:
 (a) operating a radar sensor aboard said automotive vehicle to sense the position of said object in said potential drive path of said automotive vehicle and accordingly transmit radar sensor data to a data processing system aboard said automotive vehicle;
 (b) operating two ultrasonic sensors aboard said automotive vehicle to sense said position of said object in said potential drive path of said automotive vehicle and accordingly transmit ultrasonic sensor data to said data processing system aboard said automotive vehicle; and
 (c) operating said data processing system to receive said radar sensor data and said ultrasonic sensor data, selectively process said radar sensor data and said ultrasonic sensor data, and accordingly transmit operating instructions to said collision countermeasure system and said parking assistance system so as to operate said collision countermeasure system and said parking assistance system in a selective manner.

12. A method according to claim 11, said method further comprising the step of:
 mounting said radar sensor at the center of the frontal periphery of said automotive vehicle.

13. A method according to claim 11, said method further comprising the step of:
 spacing said two ultrasonic sensors apart and mounting said two ultrasonic sensors at opposite sides of the frontal periphery of said automotive vehicle.

14. A method according to claim 11, said method further comprising the step of:
 mounting said radar sensor and said two ultrasonic sensors at the frontal periphery of said automotive vehicle.

15. A method according to claim 11, said method further comprising the steps of:
 mounting said radar sensor at the center of the frontal periphery of said automotive vehicle; and
 spacing said two ultrasonic sensors apart and mounting said two ultrasonic sensors at opposite sides of said frontal periphery of said automotive vehicle.

16. A method according to claim 11, wherein step (c) comprises the sub-step of:
 operating said data processing system to execute a data fusion algorithm so as to selectively aggregate and sort said radar sensor data and said ultrasonic sensor data.

17. A method according to claim 11, wherein step (c) comprises the sub-step of:
 operating said data processing system to execute a data fusion algorithm so as to selectively aggregate and sort said radar sensor data and said ultrasonic sensor data into at least one of two data categories, said two data categories being predefined as data utile for collision prediction and data utile for parking assistance.

18. A method according to claim 11, wherein step (c) comprises the sub-steps of:
 operating said data processing system to receive dynamics data of said automotive vehicle and therefrom determine the average speed of said automotive vehicle;
 operating said data processing system to determine whether said average speed of said automotive vehicle is greater than a predetermined parking assistance speed limit;
 operating said data processing system, when said average speed of said automotive vehicle is determined to be greater than said predetermined parking assistance speed limit, to selectively process said radar sensor data and accordingly transmit operating instructions to said collision countermeasure system so as to operate said collision countermeasure system in a selective manner; and
 operating said data processing system, when said average speed of said automotive vehicle is determined to be less than said predetermined parking assistance speed limit, to selectively process said radar sensor data and said ultrasonic sensor data and accordingly transmit operating instructions to said parking assistance system so as to operate said parking assistance system in a selective manner.

19. A method according to claim 11, wherein step (c) comprises the sub-step of:
 operating said data processing system to execute decision-making algorithms so as to determine said operating instructions for said collision countermeasure system and said parking assistance system in accordance with said radar sensor data and said ultrasonic sensor data.

20. A method for preemptively sensing an object in the potential drive path of an automotive vehicle and selectively operating both a collision countermeasure system and a parking assistance system aboard said automotive vehicle, said method comprising the steps of:

(a) operating a radar sensor aboard said automotive vehicle to sense the position of said object in said potential drive path of said automotive vehicle and accordingly transmit radar sensor data to a data processing system aboard said automotive vehicle;

(b) operating two ultrasonic sensors aboard said automotive vehicle to sense said position of said object in said potential drive path of said automotive vehicle and accordingly transmit ultrasonic sensor data to said data processing system aboard said automotive vehicle;

(c) operating said data processing system to receive said radar sensor data and said ultrasonic sensor data;

(d) operating said data processing system to receive dynamics data of said automotive vehicle and therefrom determine the average speed of said automotive vehicle;

(e) operating said data processing system to determine whether said average speed of said automotive vehicle is greater than a predetermined parking assistance speed limit;

(f) operating said data processing system, when said average speed of said automotive vehicle is determined to be greater than said predetermined parking assistance speed limit, to selectively process said radar sensor data and accordingly transmit operating instructions to said collision countermeasure system so as to operate said collision countermeasure system in a selective manner; and (g) operating said data processing system, when said average speed of said automotive vehicle is determined to be less than said predetermined parking assistance speed limit, to selectively process said radar sensor data and said ultrasonic sensor data and accordingly transmit operating instructions to said parking assistance system so as to operate said parking assistance system in a selective manner.

* * * * *